Jan. 12, 1943.  W. J. JACOBSSON  2,307,838
ALTITUDE CONTROLLED VALVE
Filed Oct. 17, 1940

INVENTOR
WILGOT J. JACOBSSON
BY
ATTORNEY

Patented Jan. 12, 1943

2,307,838

UNITED STATES PATENT OFFICE 2,307,838

ALTITUDE-CONTROLLED VALVE

Wilgot J. Jacobsson, Plainfield, N. J., assignor, by mesne assignments, to Union Carbide and Carbon Corporation, a corporation of New York Application October 17, 1940, Serial No. 361,490

10 Claims. (Cl. 137—153)

This invention relates to apparatus for supplying oxygen for high altitude operation of aircraft and similar purposes, and more particularly to an altitude-controlled valve for varying the volume of oxygen supplied to consuming devices in accordance with changes in atmospheric pressure corresponding to changes in altitude.

In high altitude flying, additional oxygen must be supplied to the occupants of an airplane due to the increased rarity of the atmosphere. The additional amount of oxygen required is substantially proportional to the altitude at which the aircraft is flying. As both space and weight are at a premium in aircraft, the bulk and weight of the oxygen supply and associated regulating and indicating apparatus must be kept as small as possible. For this reason, the oxygen usually is supplied in cylinders in which the oxygen is compressed under relatively high pressure. In order to relieve the operator of the airplane from the necessity of controlling the volume of oxygen supplied in accordance with changes in altitude, it has hitherto been proposed to use automatic apparatus for supplying varying quantities of oxygen to the interior of the aircraft in accordance with changes in altitude, which changes are reflected in corresponding changes in the atmospheric pressure.

Such apparatus as hitherto used has not been very sensitive to changes in altitude nor has it been capable of producing gradual changes in the volume of oxygen supplied with relatively rapid changes in altitude. Additionally, such apparatus has neither been dependable nor economical and has required additional and separate indicating apparatus to denote the quantity of oxygen being supplied at a given time.

It is therefore among the objects of this invention to provide an altitude-controlled valve which is sensitive to changes in atmospheric pressure to produce gradual changes in oxygen flow with relatively rapid changes in altitude; to provide an altitude-controlled valve including an indicating device operatively associated therewith to show the rate of flow of oxygen passing through the valve; and to provide an altitude-controlled valve which is easy to manufacture, and dependable and economical in operation.

Figure 1:
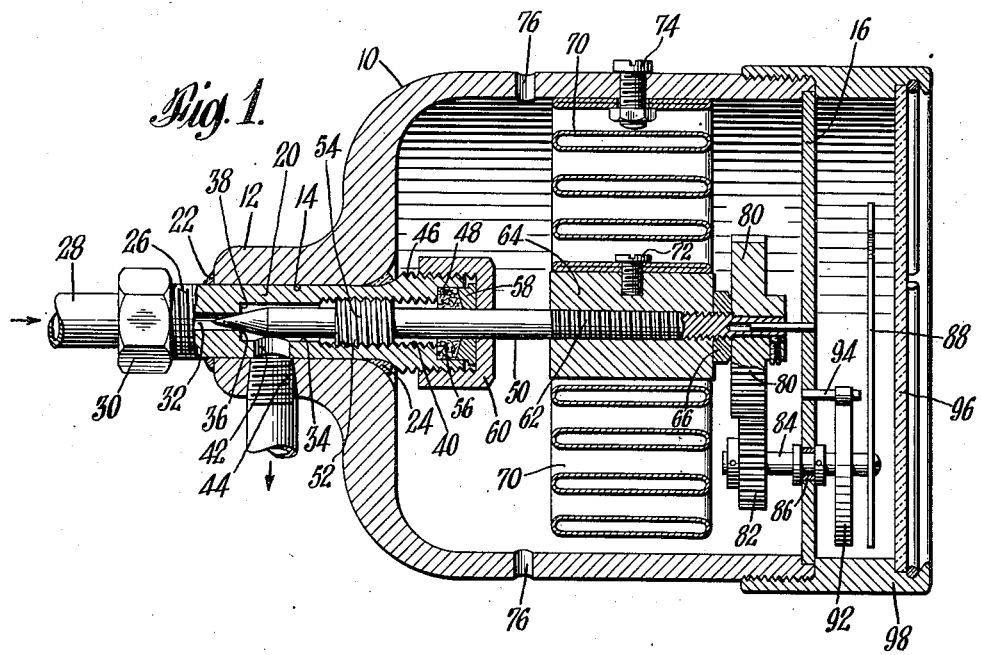
Figure 2:
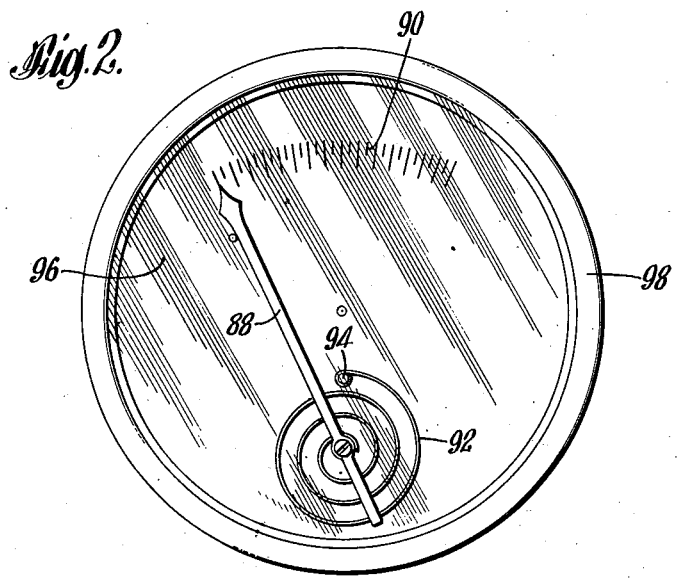

These and other objects of the invention will in part be obvious and in part become apparent from the following description and accompanying drawing, in which:

Fig. 1 is a sectional view through an altitude-controlled valve embodying the principles of the invention; and Fig. 2 is a right hand end view of the valve shown in Fig. 1.

Generally speaking, the objects of the invention are attained by controlling the flow of oxygen by a rotatable valve means, somewhat similar to the conventional needle-valve, and atmospheric pressure responsive means, such as a Bourdon tube, for varying the oxygen flow in accordance with changes in atmospheric pressure corresponding to changes in altitude. The Bourdon tube is arranged to rotate the valve means and thereby vary the flow of oxygen through the valve by varying the amount of opening of the orifice to which the oxygen is supplied. Through a suitable gearing arrangement, indicating apparatus, for indicating rate of flow of oxygen and/or the altitude or the atmospheric pressure may be operatively associated with the Bourdon tube and the valve.

Referring to the drawing, the altitude-controlled valve of the invention includes a bell-shaped housing or casing 10. The closed end of the housing is formed with a boss 12, drilled or bored longitudinally to form a passage 14, and the open end of the housing may be closed by a cover plate 16 suitably secured to the housing.

A valve body 20 is seated in passage 14 and gas-tightly secured to the housing 10 by suitable means, such as silver soldered joints 22 and 24. Valve body 20 extends outwardly beyond boss 12, and is formed with external threads 26. An oxygen inlet pipe 28 is seated in the end of the valve body and is held in place by a lock nut 30 engaging threads 26. Coaxial passages 32 and 34 extend through the valve body and are connected by a valving orifice 36 formed by an internal annular shoulder 38 in the body 20. One part of the wall of passage 34 is formed with threads 40, and the other part of the wall is formed with an aperture 42 registering with an internally threaded outlet aperture or opening 44 in the boss 12. A suitable oxygen outlet pipe may be threadedly secured in opening 44. At its inner end, body 20 is enlarged and threaded as at 46 and formed with a recess 48 coaxially aligned with passage 34.

Flow of oxygen through valving orifice 36 is controlled by a rotatable valve stem or needle-valve 50 having an enlarged portion 52 formed with threads 54 coacting with threads 40. Passage 34 is gas-tightly sealed by packing 56 seated in recess 48 and compressed by a washer 58 and a packing nut 60 engaging the threads 46 on the valve body.

Valve stem 50 projects inwardly beyond valve body 20, and its inner end is formed with threads 62. A cylindrical member 64 engages threads 62 and is adjustably held in place by a lock nut 66.

The free inner end of a conventional spiral-shaped Bourdon tube 70 (shown in cross-section in Fig. 1) is secured to member 64 by a screw 72, and the outer end of the tube is secured to housing 10 by suitable means, such as a bolt and nut 74. The Bourdon tube 70 preferably is evacuated so that it is substantially unaffected by temperature variations. In order that the tube 70 may be subjected to the ambient atmospheric pressure, housing 10 is formed with apertures 76.

The operation of that part of the invention so far described will be readily understood by reference to the drawing. The housing 10 being fixed or stationary, the Bourdon tube 70 will expand and contract in accordance with variations in atmospheric pressure, in a manner well understood by those in the art. When the tube expands with a decrease in atmospheric pressure, its free inner end rotates the valve stem 50 in a direction to increase the effective area of orifice 36, permitting an increased flow of oxygen through the orifice to the outlet opening 44. Conversely, with an increase in atmospheric pressure, the tube 70 contracts and its free end will rotate the valve stem 50 in a direction to close the orifice 36. Operating in this manner, the Bourdon tube constitutes atmospheric pressure responsive means operative to rotate the valve means in such a manner as to vary the flow of fluid through said orifice in inverse ratio to changes in atmospheric pressure. The effective orifice area at any given altitude, and the altitude at which delivery of oxygen will begin, can be preselected by loosening lock nut 66 and adjusting the position of member 64 on the valve stem. This adjustment is easily made after removing cover plate 16.

An important feature of the present invention is the provision of means to indicate the rate of flow of oxygen, and/or the altitude or atmospheric pressure. For this purpose, a spur gear 80 is suitably secured on the extreme inner end of valve stem 50 and meshes with a spur gear 82 on one end of a shaft 84 mounted in a bearing 86 in the cover plate 16. On the opposite end of shaft 84 is an indicating needle 88 cooperating with a scale 90 secured to or marked on the cover plate 16 and graduated to indicate the rate of flow of oxygen and/or the altitude or ambient atmospheric pressure. Rotation of shaft 84 is restrained by a spring 92 secured at one end to the shaft and at its other end to a pin 94 on the cover plate 16. The indicating apparatus may be enclosed by a transparent cover plate 96 mounted in a rim member 98 suitably secured to housing 10.

It will be obvious that rotation of valve stem 50 under the influence of the coiled Bourdon tube 70 will move needle 88 along scale 90 to indicate the rate of flow of oxygen, altitude, and/or ambient atmospheric pressure. If desired, spring 92 may be omitted and the contraction of tube 70 be relied upon to return the needle to the zero point of the scale.

The altitude-controlled valve is simple, compact and effective to vary gradually the oxygen flow with rapid changes in altitude. The directly associated indicating means affords a ready indication of oxygen flow and/or altitude or barometric pressure.

While a specific embodiment of the invention has been described in detail to describe the application of the principles of the invention, it should be understood that the invention may be otherwise embodied and the dimensions and inter-relation of parts altered, within the scope of the appended claims.

What is claimed is:

1. An altitude-controlled valve comprising, in combination, a housing having an inlet and an outlet; rotatable axially movable valve means controlling the flow of fluid between said inlet and said outlet; and atmospheric pressure responsive means operative to rotate said rotatable axially movable valve means in such a manner as to vary such flow of fluid in inverse ratio to changes in atmospheric pressure.

2. An altitude-controlled valve comprising, in combination, a housing having an inlet and an outlet; valve means rotatably mounted in said housing and movable axially to control communication between said inlet and said outlet; and means for rotating said valve means comprising a Bourdon tube secured at one end to said housing and at the other end to said valve means, and operative to rotate said valve means in such a manner as to vary the flow of fluid between said inlet and said outlet in inverse ratio to changes in atmospheric pressure.

3. An altitude-controlled valve as claimed in claim 2, including means operatively associated with said rotatable valve means for indicating the rate of flow of fluid between said inlet and said outlet.

4. An altitude-controlled valve comprising, in combination, a housing having an inlet and an outlet; a valve body mounted in said housing and communicating with said inlet and said outlet, said valve body being formed with a valving orifice; a valve stem rotatably mounted in said valve body and movable axially thereof to control the flow of fluid through said valving orifice; and atmospheric pressure responsive means operative to rotate said valve stem to move the same axially of said valve body to vary the relation between said valve stem and said valving orifice in such a manner as to vary the flow of fluid through said orifice in inverse ratio to changes in atmospheric pressure.

5. An altitude-controlled valve as claimed in claim 4, in which said last-named means comprises a Bourdon tube connected at one end to said valve stem and at the other end to said housing.

6. An altitude-controlled valve as claimed in claim 4, including a cover plate having a scale thereon; a needle operatively associated with said scale and pivotally mounted in said cover plate; and means operatively connecting said needle to said valve stem.

7. An altitude-controlled valve as claimed in claim 4, in which said housing is formed with a boss having an aperture therein, said valve body is formed with an aperture registering with the aperture in said boss and is internally threaded, and said valve stem is formed with an externally threaded portion for engagement with the internally threaded portion of said valve body.

8. An altitude-controlled valve as claimed in claim 4, in which a cylindrical member is threadedly secured to the inner end of said valve stem and said atmospheric pressure responsive means comprises a Bourdon tube secured to said cylindrical member and to said housing.

9. An altitude-controlled valve as claimed in claim 4, in which the inner end of said valve stem is formed with a threaded portion, a cylindrical member is secured to said threaded portion, and locking means are secured to said threaded portion for retaining said cylindrical member in adjusted position thereon.

10. An altitude-controlled valve as claimed in claim 4, including a cover plate closing one end of said housing; a scale on said cover plate; an indicating needle; and means operatively connecting said needle to said atmospheric pressure responsive means.

WILGOT J. JACOBSSON.